Figure 1:
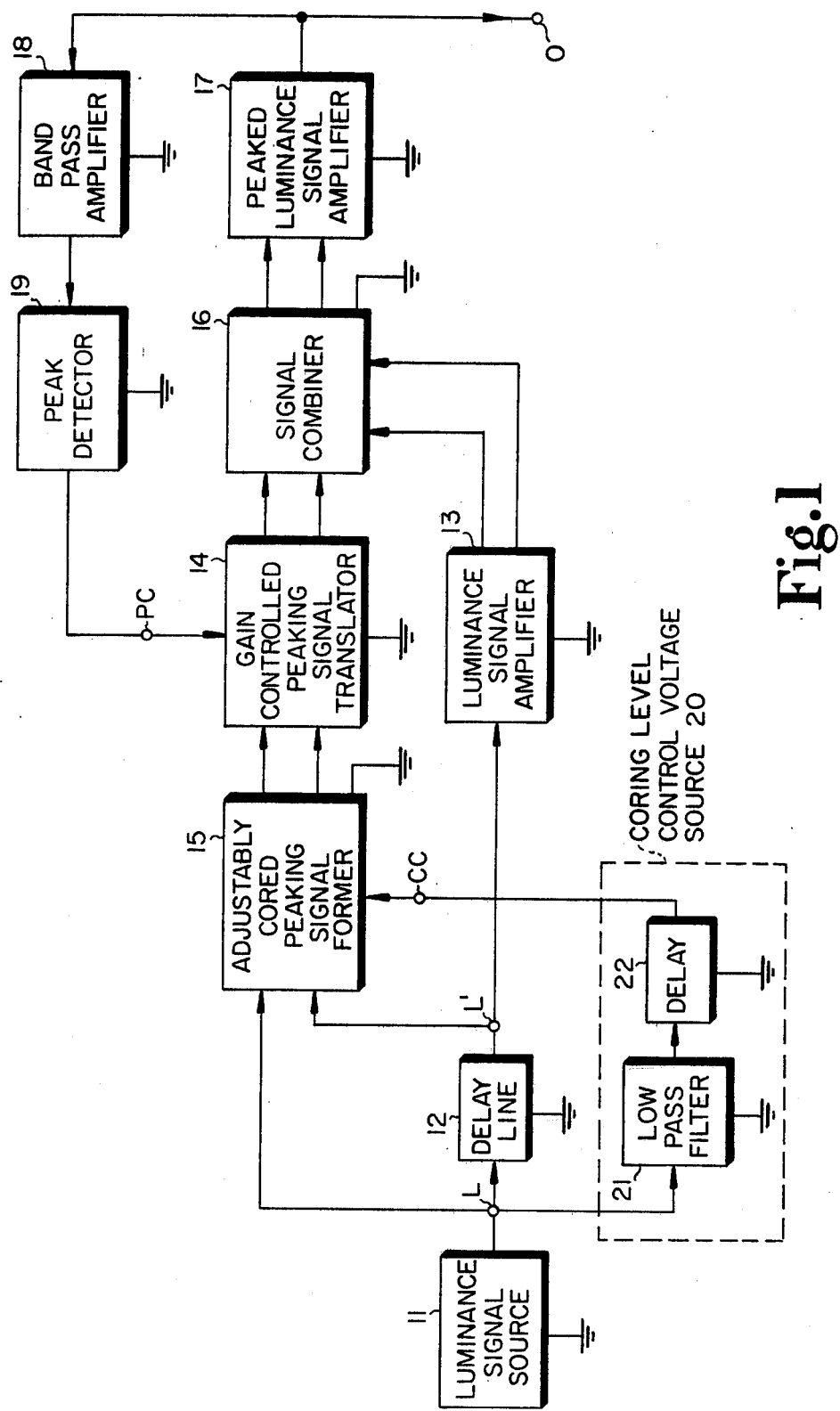

United States Patent [19]

Cochran

[11] 4,437,124
[45] Mar. 13, 1984

[54] DYNAMIC CORING CIRCUIT
[75] Inventor: Larry A. Cochran, Indianapolis, Ind.
[73] Assignee: RCA Corporation, New York, N.Y.
[21] Appl. No.: 373,750
[22] Filed: Apr. 30, 1982
[51] Int. Cl.³ .............................................. H04N 5/14
[52] U.S. Cl. ...................................... 358/166; 358/39
[58] Field of Search ..................... 358/166, 167, 21 R, 358/31, 37, 39; 307/221 D, 230, 304; 328/142, 143, 166

[56] References Cited
U.S. PATENT DOCUMENTS 4,167,749 9/1979 Burrus ..................................... 358/8
4,350,995 9/1982 Harlan ................................. 358/166
4,399,460 8/1983 Harwood ............................. 358/166

Primary Examiner—Michael A. Masinick
Attorney, Agent, or Firm—Eugene M. Whitacre; Paul J. Rasmussen; William H. Meagher

[57] ABSTRACT

In a television receiver, a horizontal peaking signal is formed for addition to a luminance signal to enhance its horizontal detail by relatively boosting high frequency components of the luminance signal. The peaking signal is subject to a coring action with the depth of coring subject to dynamic control in accordance with level variations of low frequency content of the luminance signals. The sense of control is such that a greater coring depth is associated with dark portions of a scene to be reproduced than is associated with bright portions thereof.

3 Claims, 2 Drawing Figures

DYNAMIC CORING CIRCUIT

The present invention relates generally to dynamically controlled coring circuits for the processing of signals to be utilized in reproduction of images, and particularly to a novel arrangement for adjustably coring a signal representative of the high frequency content of luminance signals wherein the depth of coring is varied in consonance with shifts of the low frequency content of the luminance signals between black and white limits.

Coring of a signal (i.e., removing a close-to-average-axis "core" of the signal, by processing the signal with a translator exhibiting a transfer characteristic with a dead zone for close-to-axis signal excursions) is a known signal processing function, occasionally resorted to for noise reduction purposes, as explained, for example, in an article by J. P. Rossi, entitled "Digital Techniques for Reducing Television Noise", appearing on pages 134–140 of the March, 1978 issue of the SMPTE Journal. In certain uses of a coring circuit, a facility for adjusting the level of coring to be effected may be desired. The facility may permit manual adjustment of the coring level (as shown, for example, in an article by R. H. McMann, et al., entitled "Improved Signal Processing Techniques for Color Television Broadcasting", appearing on pages 221–228 of the March 1968 issue of the SMPTE Journal), or may provide for a dynamic adjustment of coring level (as shown, for example, in U.S. Pat. No. 4,167,749 - Burrus).

In the aforementioned Burrus patent, coring of the high frequency portion of a luminance signal is effected with the depth of coring dynamically varying in accordance with the magnitude of noise detected as accompanying the luminance signal. When the detected noise level is relatively high, the coring depth is caused to be relatively large in an effort to enhance the signal-to-noise ratio; when the detected noise level is relatively low, the coring depth is caused to be relatively small so as to minimize disturbance of desired signal variations.

In contrast to the Burrus approach which tailors coring depth to the apparent need for noise reduction, the present invention adjusts coring depth in accordance with the relative visibility of noise disturbances, present or not. It is an observed phenomenon that low levels of background noise are more noticeable to a viewer when present in a dark portion of a viewed scene than when present in a bright portion thereof. In recognition of this phenomenon, the depth of coring in a system embodying the principles of the present invention is varied inversely with brightness level, with maximum coring effected at the black extreme and minimum coring effected at the white extreme. The coring control potential is desirably derived from a low pass filtered version of the luminance signal, so that excessively rapid changes of coring level are not effected in response to high frequency luminance components or the accompanying high frequency noise components.

In accordance with an illustrative embodiment of the present invention, the above-described approach to dynamic coring is used advantageously in the processing of a horizontal peaking signal derived for addition to a luminance signal to enhance the horizontal detail thereof. The coring of such a peaking signal lessens the likelihood that undesired enhancement of background noise will accompany the desired picture detail enhancement. The dynamic control of the coring depth pursuant to the principles of the invention maximizes the protection against noise enhancement in those regions of the viewed scene where noise enhancement would be most objectionable and lessens the protection in those regions more tolerant of a higher noise level.

Figure 2:
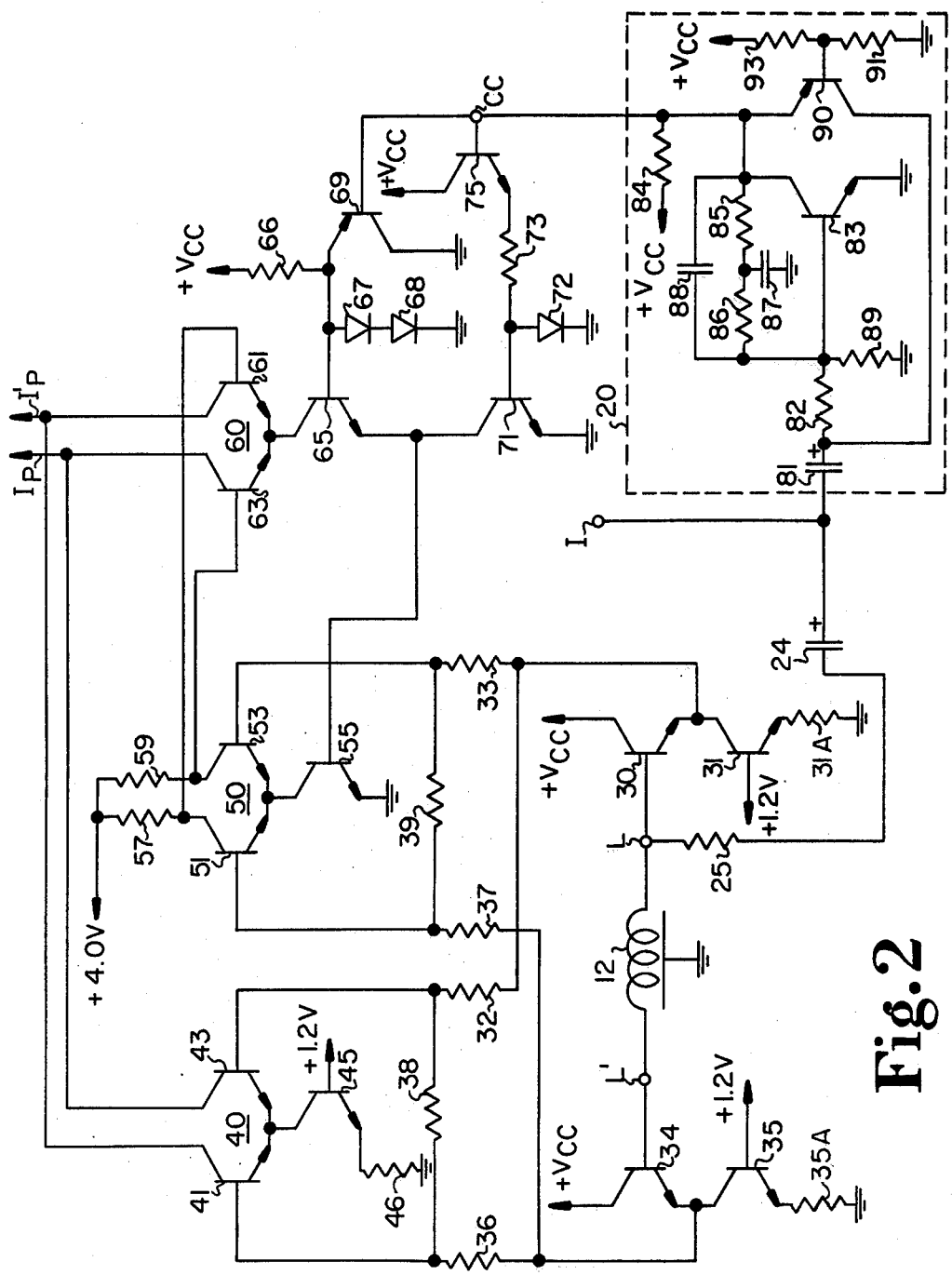

In the accompanying drawings:

FIG. 1 illustrates, by block representation, a portion of a television receiver incorporating a horizontal peaking system for luminance representative signals, wherein the depth of coring of the peaking signals is controlled pursuant to the principles of the present invention; and FIG. 2 illustrates schematically circuits for implementing elements of the FIG. 1 system in accordance with a particular embodiment of the present invention.

In FIG. 1, the output of a luminance signal source 11 (e.g., in a color television receiver use, constituted by the luminance signal output of the receiver's comb filter) is supplied to the input terminal (L) of a delay line 12. Signals appearing at terminal L, and the signals appearing at the output terminal (L') of the delay line 12, are supplied as inputs to an adjustably cored peaking signal former 15, which may, for example, comprise apparatus of the type described in the copending U. S. patent application Ser. No. 363,868, now abandoned in favor of a C-I-P Ser. No. 460,895 of L. A. Harwood, et al., filed Mar. 31, 1982 and entitled "Adjustable Coring Circuit".

With the input end of the delay line 12 suitably terminated by an impedance substantially matching the characteristic impedance of the delay line, and with the output end of the delay line 12 misterminated to obtain a reflective effect, the signal inputs to the peaking signal former 15 comprise a once-delayed luminance signal (from terminal L'), and the sum of an undelayed luminance signal and a twice-delayed luminance signal (from terminal L). With the delay imparted by delay line 12 chosen to equal a half period at a selected frequency within the high frequency portion of the spectrum occupied by luminance signal components, the difference between the respective signals at terminals L and L' corresponds to an appropriate horizontal peaking signal for addition to the luminance signal to enhance its horizontal detail. Peaking signal former 15 forms a peaking signal corresponding to such a signal difference, subject, however, to removal of its close-to-axis core to a depth dependent upon the magnitude of a coring depth control potential supplied to its coring control input terminal CC. Illustratively, two versions of the adjustably cored peaking signal of mutually opposite phasing are developed as outputs of the peaking signal former 15.

The push-pull cored peaking signal outputs of the peaking signal former 15 are supplied as signal inputs to a gain controlled peaking signal translator 14, which translates the cored peaking signals with a gain (or attenuation) determined by a control voltage applied to a peaking control terminal PC. The push-pull outputs of translator 14 are summed with the push-pull outputs of a luminance signal amplifier 13, responsive to the delayed luminance signals at terminal L', in a signal combiner 16 to form push-pull versions of a peaked luminance signal for application to a peaked luminance signal amplifier 17. Amplifier 17 converts the push-pull peaked luminance signal inputs to single-ended form at output terminal 0, from which terminal the peaked luminance signal may be delivered, for example, to a color receiver's matrix circuits for combination with respective color-difference signals.

The output of amplifier 17 is also applied to the input of a bandpass amplifier 18 for automatic peaking control purposes. Illustratively exhibiting a passband of approximately 1 MHz. bandwidth centered about a frequency of approximately 2 MHz., amplifier 18 delivers the components of the peaked luminance signal falling within its passband to a peak detector 19, which develops a control voltage proportional to the amplitude of the delivered components. This control voltage is applied to terminal PC to control the magnitude of the peaking signals supplied to combiner 16 in a sense opposing changes in the amplitude of said delivered components. Reference may be made to U. S. Pat. No. 4,399,460, for a more detailed explanation of the operation of such an automatic peaking control system, and examples of advantageous circuitry for implementing the functions of the elements 13, 14, 16, 17, 18 and 19 (as well as for associating a manual peaking control therewith).

Pursuant to the principles of the present invention, the depth of coring of the peaking signal output of peaking signal former 15 is controlled in accordance with the amplitude level of the low frequency content of the luminance signals provided by source 11. For this purpose, the coring control input terminal CC of signal former 15 is rendered responsive to the output of a coring level control voltage source 20. As illustrated, the coring level control voltage source 20 comprises a low pass filter 21, having its input coupled to receive the luminance signal output of source 11, and having its output coupled (via an optional delay element 22) to the control terminal CC. For the desired sense of the dynamic coring control, the poling of the output of the control voltage source 20 should be such that a shift of the low pass filter output in the black direction effects an increase in the depth of coring, whereas a shift of the low pass filter output in the white direction effects a decrease in the depth of coring. For optimum timing of the dynamic variations of coring depth, the overall delay in the control path via source 20 should substantially match the delay of the once-delayed signal input to signal former 15. Where the delay associated with low pass filter 21 substantially matches the delay imparted by delay line 12, the optional delay element 22 may be eliminated; where the delay associated with low pass filter 21 is insufficient for such matching purposes, the needed additional control path delay may be provided by delay element 22.

FIG. 2 illustrates in schematic detail an adjustably cored peaking signal former, of the type disclosed in the aforementioned Harwood, et al. patent application entitled "Adjustable Coring Circuit", with control of depth of coring effected in accordance with a particular embodiment of the present invention. The particularly illustrated circuitry of the coring level control voltage source, in which feedback clamping is employed to ensure a desired positioning of the coring control range, is the subject of a copending U. S. patent application Serial No. 373,531 of W. E. Harlan, entitled "Dynamically Controlled Horizontal Peaking System" and concurrently filed herewith.

In FIG. 2, luminance signals appearing at a peaking system input terminal I are applied via a blocking capacitor 24 in series with a resistor 25 to the input terminal L of delay line 12. Illustratively, the delay line 12 is a wideband device exhibiting a linear phase characteristic over the frequency band occupied by the luminance signals (e.g., extending to 4.0 MHz.), and provides a signal delay of 140 nanoseconds. The input end of delay line 12 is terminated (e.g., through the aid of resistor 25) in an impedance substantially matching its characteristic impedance, whereas the output end of the delay line (at terminal L') is misterminated to obtain a reflective effect. The signals appearing at the respective ends of the delay line 12 are thus: (a) a once-delayed luminance signal at terminal L', and (b) the sum of an undelayed luminance signal and a twice-delayed luminance signal at terminal L. The difference between the respective signals at terminals L and L' corresponds to an appropriate horizontal peaking signal for addition to the luminance signal to enhance its horizontal detail by effectively boosting high frequency luminance components, with the maximum boost occurring at approximately 3.5 MHz.

A differential amplifier 40, accepting signals from terminals L and L' at its respective differential inputs, provides a linear amplification channel for such a peaking signal. Amplifier 40 includes a pair of NPN transistors 41, 43 with interconnected emitter electrodes returned to a point of reference potential (e.g., ground) via the collector-emitter path of an NPN current source transistor 45 in series with emitter-resistor 46. The base electrode of transistor 45 is connected to the positive terminal (+1.2 V.) of a bias potential supply to establish a desired operating current for amplifier 40.

Signals from terminal L' are supplied to the base electrode of transistor 41 via the base-emitter path of an NPN emitter-follower transistor 34 and a series coupling resistor 36. The collector electrode of transistor 34 is directly connected to the positive terminal (+Vcc) of an operating potential supply, while the emitter electrode of transistor 34 is returned to ground via the collector-emitter path of a current source transistor 35 (with its base tied to +1.2 V. and its emitter grounded via resistor 35A). Signals from terminal L are supplied to the base electrode of transistor 43 via the base-emitter path of an NPN emitter-follower transistor 30 and a series coupling resistor 32. The collector electrode of transistor 30 is directly connected to the +Vcc supply terminal, while the emitter electrode of transistor 30 is returned to ground via the collector-emitter path of a current source transistor 31 (with its base tied to +1.2 V. and its emitter grounded via resistor 31A). While direct connections are illustrated between the respective terminals L, L' and the bases of emitter-follower transistors 30, 34, additional emitter-followers (not shown) may desirably be interposed in the respective connections to elevate the impedances presented to the respective terminals.

A resistor 38 interconnects the base electrodes of transistors 41, 43, and cooperates with the coupling resistors 36, 32 to introduce a degree of attenuation of the input signals that ensures that the maximum signal difference between base potentials is accommodated within the linear signal handling range of amplifier 40. The respective collector electrodes of transistors 41 and 43 are linked to the positive terminal of an operating potential supply by respective loads (not shown) which are shared by the outputs of a limiting amplifier to be subsequently described. The respective collector currents of transistors 41 and 43 vary in accordance with oppositely phased versions of the peaking signals.

A differential amplifier 50, accepting signals from terminals L and L' at its respective differential inputs, serves as the input stage of a limiting amplifier providing a non-linear amplification channel for the peaking signal. Amplifier 50 includes a pair of NPN transistors 51, 53 with interconnected emitter electrodes returned to ground via the collector-emitter path of an NPN current source transistor 55. Signals from terminal L', appearing at the output of emitter-follower transistor 34, are supplied to the base electrode of transistor 51 via a series coupling resistor 37. Signals from terminal L, appearing at the output of emitter-follower transistor 30, are supplied to the base electrode of transistor 53 via a series coupling resistor 33. A resistor 39 interconnects the base electrodes of transistors 51 and 53. The input signal attenuation provided by the network of resistors 37, 39, 33 is less than the attenuation provided by the linear amplifier network (36, 38, 32), and permits the maximum signal swing between bases to exceed the linear signal handling range of amplifier 50.

The collector electrodes of transistors 51 and 53 are individually connected by respective load resistors (57, 59) to the positive terminal (+4.0 V.) of an operating potential supply. Oppositely phased peaking signals (with maximum excursions clipped) appear across the respective load resistors 57 and 59.

Differential amplifier 60, serving as the output stage of the limiting amplifier and providing further clipping of the peaking signals, includes a pair of NPN transistors 61 and 63 with interconnected electrodes connected to the collector electrode of a current source transistor 65. The emitter electrode of transistor 65 is returned to ground via the base-emitter path of current source transistor 55. The base electrode of transistor 61 is directly connected to the collector electrode of transistor 51 of the input stage, while the base electrode of transistor 63 is directly connected to the collector electrode of transistor 53 of the input stage.

The collector electrode of transistor 61 is directly connected to the collector electrode of transistor 41 of the linear amplifier so that the summed collector currents of transistors 41 and 61 form a cored peaking signal current (Ip'). The collector electrode of transistor 63 is directly connected to the collector electrode of transistor 43 of the linear amplifier so that the summed collector currents of transistors 43 and 63 form a cored peaking signal current Ip (an oppositely phased version of Ip').

A resistor 66 is connected between the positive terminal (+3.2 V.) of a bias potential supply and the anode of a diode 67, the cathode of which is directly connected to the anode of a second diode 68. The cathode of diode 68 is directly connected to ground, so that the pair of diodes 67, 68 are forward biased by the bias potential supply. The anode of diode 67 is directly connected to the base electrode of current source transistor 65, so that the voltage appearing across the diode pair (67, 68) is applied across the serially disposed base-emitter paths of current source transistors 65, 55 to forward bias their base-emitter junctions.

The collector electrode of an NPN control transistor 71 is directly connected to the base electrode of transistor 55. The emitter electrode of transistor 71 is directly connected to ground, disposing the collector-emitter path of control transistor 71 directly in shunt with the base-emitter path of the input stage's current source transistor 55.

A coring control voltage input terminal CC is connected to the base electrode of an NPN emitter-follower transistor 75 (having its collector electrode directly connected to the +Vcc supply terminal). The emitter electrode of transistor 75 is connected via resistor 73 to the base electrode of transistor 71, and to the anode of a diode 72. The cathode of diode 72 is directly connected to ground, disposing diode 72 directly in shunt with the base-emitter path of control transistor 71. A positive coring control voltage applied to terminal CC (from coring level control voltage source 20) controls the biasing of transistor 71 to vary the conductance of its collector-emitter path. The variable coring control voltage at terminal CC is also applied to the base electrode of a PNP control transistor 69. The emitter electrode of control transistor 69 is directly connected to the base electrode of current source transistor 65, and the collector electrode of control transistor 69 is directly connected to ground, thus disposing the emitter-collector path of transistor 69 in shunt with the serially connected diode pair 67, 68.

Over a substantial portion of the range of variations of the coring control potential applied to terminal CC, the base-emitter junction of the PNP control transistor 69 is reverse biased. Under such circumstances, transistor 69 is cut off and has no effect on the operation of the adjustable coring circuit, which functions in a manner as described in the aforementioned copending Harwood, et al. patent application entitled "Adjustable Coring Circuit", and as summarized immediately below.

The base-emitter path of transistor 65 forms a voltage divider with the parallel combination of (a) the base-emitter path of transistor 55, and (b) the collector-emitter path of the NPN control transistor 71, to effect a division of the bias voltage appearing across the series-connected diodes 67, 68, with the division ratio dependent upon the conductance of transistor 71. When the shunting impedance presented by transistor 71 decreases (due to an increase in the positive coring control voltage), the base-emitter voltage ($V_{be}$) of current source transistor 55 decreases, accompanied by a complementary increase of the base-emitter voltage of current source transistor 65. When the shunting impedance presented by transistor 71 increases (due to a decrease in the positive coring control voltage), the $V_{be}$ of transistor 55 increases, accompanied by a complementary decrease of the $V_{be}$ of transistor 65.

The consequence of a variation of the coring control voltage is thus an introduction of complementary variations in the operating currents of differential amplifiers 50 and 60, and, hence, complementary variations of the respective gains of the two cascaded stages of the limiting amplifier. With variations of the DC impedance presented by the NPN control transistor 71 having a negligible effect on the bias voltage appearing across diodes 67, 68, the overall gain of the limiting amplifier, proportional to the product of the magnitudes of the respective stage's operating current, remains substantially undisturbed as the distribution of gain between respective stages is varied. For accuracy of coring, this undisturbed magnitude of overall gain is set so that the gains of the respective non-linear and linear amplification channels are substantially identical.

A gain distribution change (caused by a decrease in coring control voltage) that elevates input stage (50) gain results in a clipping by the output stage (60) that is closer to the axis, and thus reduces the coring level. Conversely, a gain distribution change (caused by an increase in coring control voltage) that depresses input stage gain increases the coring level.

The role performed by the PNP control transistor 69 is confined to the end of the coring control potential variation range associated with a minimum coring level, as explained, for example, in the copending U.S. patent application Ser. No. 363,856, now abandoned in favor of a C-I-P Ser. No. 460,846 of R. L. Shanley, filed March 31, 1982 and entitled "Adjustable Coring Circuit Permitting Coring Extinction". When the potential at the coring control terminal CC falls sufficiently close to ground potential, the biasing of the base-emitter junction of PNP control transistor shifts to a forward direction. For terminal CC potentials below approximately +0.7 volts, transistor 69 is rendered conducting, and for terminal CC potentials below approximately +0.5 volts, the conduction by transistor 69 is sufficient to drive current source transistors 55, 71 into cutoff, disabling the limiting amplifier and fully extinguishing coring action. The adjustable coring circuit is thereby provided with a zero coring level for one extreme of the coring level control range.

Attention is now directed to the circuitry illustratively shown in FIG. 2 for implementation of the function of the coring level control voltage source 20 in a practical application of the principles of the present invention. The input to the coring level control voltage source 20 of FIG. 2 comprises luminance signals which illustratively appear at the peaking system input terminal I with such a polarity that the (blacker-than-black) deflection synchronizing pulse components thereof extend in a negative direction. Signals from terminal I are applied via the series combination of a blocking capacitor 81 and a resistor 82 to an NPN transistor 83 for amplification thereby, with capacitor 81 and resistor 82 coupled, in the order named, between terminal I and the base electrode of transistor 83. The emitter electrode of transistor 83 is returned directly to ground, while the collector electrode of transistor 83 is connected via a load resistor 84 to the operating potential supply terminal +Vcc. A resistor 89 directly shunts the base-emitter path of transistor 83.

Feedback between the collector and base electrodes of transistor 83 is provided via a bridged-T filter network formed by a pair of resistors 85 and 86 connected in series between said collector and base electrodes, a capacitor 88 connected in shunt with the series combination of resistors 85, 86, and a capacitor 87 connected between ground and the junction of the serially disposed resistors 85, 86.

A PNP transistor 90, performing a feedback clamping action, has its emitter electrode directly connected to the collector electrode of amplifying transistor 83, and its collector electrode directly connected to the junction of capacitor 81 and resistor 82. The series combination of a pair of resistors 91, 93 is connected between ground and the +Vcc terminal to form a voltage divider, which develops a reference DC potential at the junction of resistors 91, 93 for direct application to the base electrode of the clamping transistor 90.

The described circuitry forms an inverting signal translator for the input luminance signals which exhibits a low pass frequency response characteristic and provides a signal delay appropriate for substantial matching with the delay imparted by delay line 12. For an illustrative set of circuit parameters (set forth in a listing below), the high frequency roll-off of the frequency response characteristic is desirably gradual with the cutoff frequency (−3 db. point on the characteristic) falling at approximately 1.05 MHz.

In operation of the disclosed circuitry for source 20, capacitor 81 isolates the signal translator from variations of DC level at terminal I, that may be a consequence, for example, of signal swing adjustments effected in the source of luminance signals (as discussed more fully in the aforementioned copending Harlan patent application). A DC restoring action is performed by clamping transistor 90, which is periodically driven into conduction during sync pulse appearances. The charge on capacitor 81 is subject to a readjustment during these conduction periods that tends to clamp sync pulse peaks of the translator output at a potential determined by the reference potential developed by the voltage divider 93, 91 (and slightly offset therefrom). The reference potential is selected so that the translator output potential (at terminal CC) developed in response to a black level input introduces a desired coring depth (e.g., 6%). The gain of the signal translator, as determined by the ratio of the resistance value of resistor 82 and the sum of the resistance values of resistors 85 and 86, is selected so that the black-to-white signal swing for the translator output potential at terminal CC provides the desired gamut of coring depth variations. Illustratively, the gain selection is such that a zero coring level is reached for white levels beyond 70 to 80 IRE units.

An illustrative set of values for circuit parameters of the FIG. 2 system is, as follows:

Resistor 25: 680 ohms
Resistors 32, 36: 2.4 kilohms
Resistors 33, 37: 470 ohms
Resistor 38: 1000 ohms
Resistor 39: 4.7 kilohms
Resistors 57, 59, 46: 500 ohms
Resistor 66: 13.3 kilohms
Resistor 73: 25 kilohms
Potential (+Vcc): 11.2 volts
Capacitor 24: 1 microfarad
Capacitor 81: 33 microfarads
Resistors 82, 31A, 35A: 2 kilohms
Resistors 85, 86: 5.6 kilohms
Resistor 84: 1.8 kilohms
Resistor 89: 3.3 kilohms
Resistor 91: 3 kilohms
Resistor 93: 8.2 kilohms
Capacitor 87: 22 picofarads
Capacitor 88: 150 picofarads

What is claimed is:

1. In an image reproduction system including a source of luminance signals representative of variations of the luminance of an image between black and white extremes; a dynamic coring circuit comprising:

means, coupled to said source, for developing a cored version of a signal representative of the high frequency content of said luminance signals, said cored version corresponding to the difference between a linearly translated version of said high frequency content representative signal and a doubly clipped version of said high frequency content representative signal; said developing means having a coring level control voltage input terminal, with the depth of coring effected by said cored version developing means dependent upon the level of a coring level control voltage applied to said input terminal; and means, responsive to said luminance signals, for developing said coring level control voltage; said control voltage developing means comprising a low pass filter coupled to said source, and means for applying the output of said low pass filter to said input terminal with such a sense as to increase the depth of coring with a shift of said low pass filter output in the black direction and to decrease the depth of coring with a shift of said low pass filter output in the white direction.

2. In a television receiver, including a source of video signals representative of variations of the luminance of an image between black and white extremes; a dynamically controlled horizontal peaking system comprising:

means, responsive to said video signals, for forming an adjustably cored horizontal peaking signal output, said forming means having a coring level control terminal, with the depth of coring of said horizontal peaking signal output dependent upon the potential appearing at said control terminal;

a low pass filter coupled to said source of video signals;

means, responsive to the output of said low pass filter, for altering the potential at said control terminal in such a manner that a variation of said low pass filter output of a black-to-white sense effects a decrease of said depth of coring whereas a variation of said low pass filter output of a white-to-black sense effects an increase of said depth of coring; and means for combining said adjustably cored horizontal peaking signal output with video signals from said source to develop a peaked luminance signal.

3. Apparatus in accordance with claim 2 wherein said forming means comprises:

a delay line having an input end coupled to receive video signals from said source and terminated in an impedance substantially matching the characteristic impedance of said delay line, and having a misterminated output end;

means, coupled to said input and output ends, for linearly amplifying the difference between signals appearing at said input and output ends of said delay line; and a limiting amplifier, coupled to said input and output ends, for nonlinearly amplifying said signal difference; said limiting amplifier comprising a plurality of amplifying stages in cascade, with the distribution of gain between said stages subject to variation in accordance with the potential appearing at said control terminal.

* * * * *

UNITED STATES PATENT AND TRADEMARK OFFICE
CERTIFICATE OF CORRECTION

PATENT NO. : 4,437,124

DATED : March 13, 1984

INVENTOR(S) : Larry Allen Cochran

It is certified that error appears in the above-identified patent and that said Letters Patent is hereby corrected as shown below:

Column 8, line 46, that portion reading "150 picofarads" should read -- 15 picofarads --.

Signed and Sealed this

Fourth Day of September 1984

[SEAL]

Attest:

GERALD J. MOSSINGHOFF

Attesting Officer

Commissioner of Patents and Trademarks